(12) United States Patent
Smith et al.

(10) Patent No.: US 12,030,280 B2
(45) Date of Patent: Jul. 9, 2024

(54) HURRICANE-RESISTANT ACOUSTIC GLAZING

(71) Applicant: KURARAY EUROPE GMBH, Hattersheim am Main (DE)

(72) Inventors: Rebecca L. Smith, Houston, TX (US); Alejandro Gonzalez, Houston, TX (US); Stephen J. Bennison, Houston, TX (US)

(73) Assignee: KURARAY EUROPE GMBH, Hattersheim am Main (DE)

( * ) Notice: Subject to any disclaimer, the term of this patent is extended or adjusted under 35 U.S.C. 154(b) by 530 days.

(21) Appl. No.: 16/781,787

(22) Filed: Feb. 4, 2020

(65) Prior Publication Data

US 2020/0251082 A1   Aug. 6, 2020

Related U.S. Application Data

(60) Provisional application No. 62/800,646, filed on Feb. 4, 2019.

(51) Int. Cl.
*B32B 27/32* (2006.01)
*B32B 17/10* (2006.01)
(Continued)

(52) U.S. Cl.
CPC .. *B32B 17/10743* (2013.01); *B32B 17/10036* (2013.01); *B32B 17/10587* (2013.01); *B32B 17/10633* (2013.01); *B32B 17/10651* (2013.01); *B32B 17/10678* (2013.01); *B32B 27/08* (2013.01); *B32B 27/302* (2013.01); *B32B 27/32* (2013.01); *G10K 11/168* (2013.01); *B32B 2307/102* (2013.01); *B32B 2307/306* (2013.01); *B32B 2307/712* (2013.01);
(Continued)

(58) Field of Classification Search
CPC ........ B32B 17/10036; B32B 17/10678; B32B 27/08; B32B 27/302; B32B 27/32; B32B 2307/102; B32B 2307/712; B32B 2315/08; B32B 2323/04; B32B 2325/00; B32B 2419/00; B32B 2250/05; G10K 11/168
See application file for complete search history.

(56) References Cited

U.S. PATENT DOCUMENTS 4,663,228 A * 5/1987 Bolton .............. B32B 17/10137
156/99
2007/0154694 A1   7/2007 Samuels et al.
(Continued)

FOREIGN PATENT DOCUMENTS

WO   WO 2015/013242 A1   1/2015
WO   WO 2017/199983 A1   11/2017

OTHER PUBLICATIONS

English translation of the International Search Report and Written Opinion of the International Searching Authority dated Jun. 4, 2020 in PCT/US2020/016537, 12 pages.

*Primary Examiner* — Maria V Ewald
*Assistant Examiner* — Daniel P Dillon
(74) *Attorney, Agent, or Firm* — Oblon, McClelland, Maier & Neustadt, L.L.P.

(57) ABSTRACT

Provided herein are multilayer polymeric interlayers comprising ionomers and acoustic damping compositions, and glass laminates made from them, which provide an improved combination of hurricane resistance, acoustic damping properties and, optionally, solar barrier performance.

17 Claims, 2 Drawing Sheets

(51) Int. Cl.
*B32B 27/08* (2006.01)
*B32B 27/30* (2006.01)
*G10K 11/168* (2006.01)

(52) U.S. Cl.
CPC ....... *B32B 2315/08* (2013.01); *B32B 2323/04* (2013.01); *B32B 2325/00* (2013.01); *B32B 2419/00* (2013.01)

(56) References Cited

U.S. PATENT DOCUMENTS

| | | | | |
|---|---|---|---|---|
| 2008/0199690 | A1* | 8/2008 | Hayes | B32B 17/10853 521/38 |
| 2009/0151773 | A1* | 6/2009 | Hayes | B32B 27/308 526/318 |
| 2017/0334173 | A1* | 11/2017 | Yui | B32B 17/10743 |

* cited by examiner

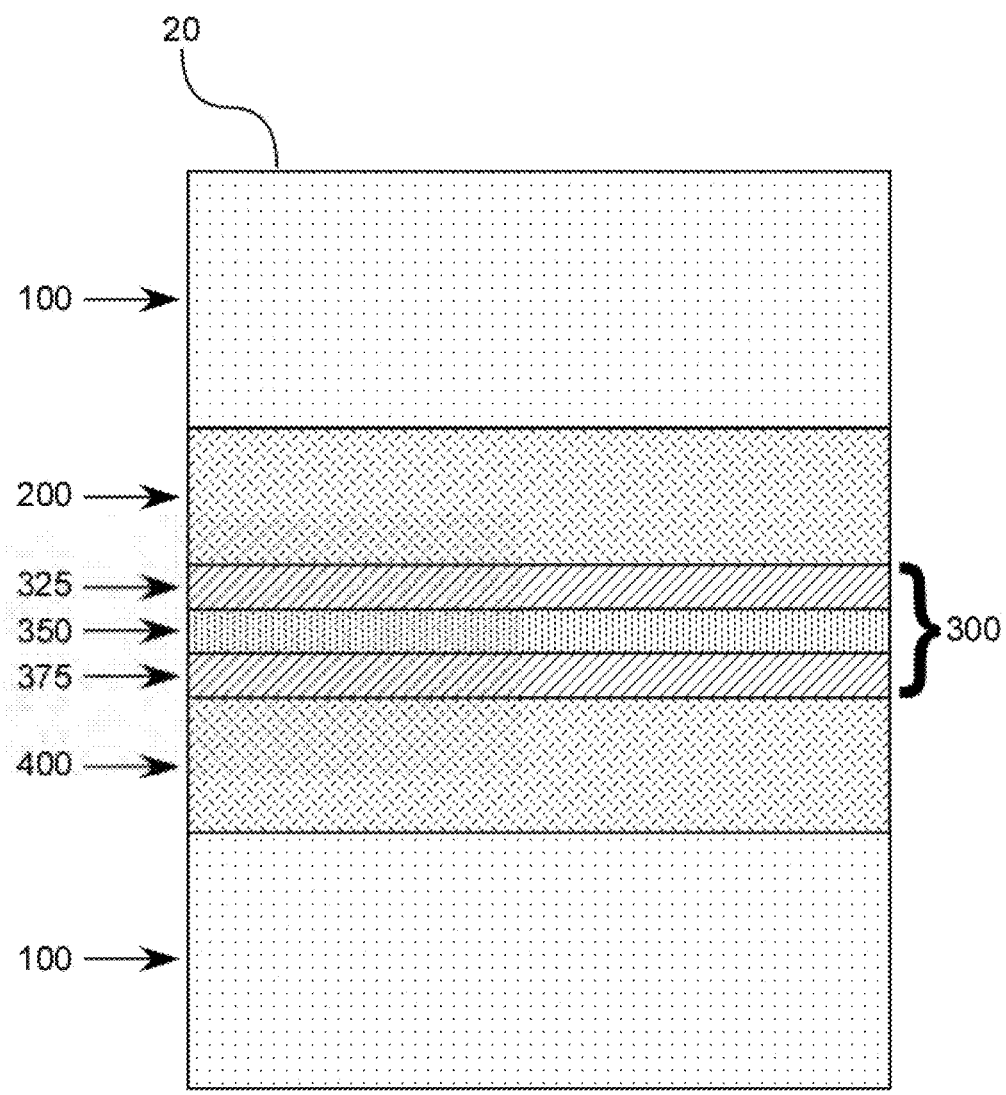

HURRICANE-RESISTANT ACOUSTIC GLAZING

CROSS-REFERENCE TO RELATED APPLICATIONS

This application claims priority under 35 U.S.C. § 119 from U.S. Provisional Application Ser. No. 62/800,646 (filed 4 Feb. 2019), the disclosure of which is incorporated by reference herein for all purposes as if fully set forth.

FIELD OF THE INVENTION

The present invention relates generally to a multilayer interlayer and a glass laminate containing such interlayer. More particularly, the present invention relates to a multilayer interlayer containing at least one ionomer layer, at least one sound insulating intermediate layer, and optionally with solar heat shielding properties, wherein the glass laminate containing such interlayer possesses a desirable combination of acoustic damping and associated sound-barrier properties, flexural strength, bending stiffness and optical properties, and optionally solar heat shielding properties, which allows for protection from wind-borne debris and hurricane-force winds.

BACKGROUND OF THE INVENTION

Laminated glass is often used for windowpanes and the like for architectural and transportation-related end uses. It is generally made by laminating two pieces of glass onto a polymeric interlayer. One particular advantage of laminated glass versus solid glass sheets is the improvement in impact and shatter resistance, as the interlayer material retains glass shards on impact. Additionally, the interlayer can also improve sound damping and sound barrier performance of the laminate as compared to a comparably thick glass sheet.

Many different materials have been used as the polymeric interlayer. For example, sheets containing a polyvinyl acetal (polyvinyl butyral) and a plasticizer are widely utilized as an interlayer for laminated glass because of their excellent adhesion-to-glass properties. These laminates can also be made with good transparency, mechanical strength and flexibility, and shatter resistance.

Additionally, at least partially neutralized ethylene acid copolymers (commonly referred to as "ionomers" and "ionoplasts") have also been used as interlayers for preparing laminated safety glass, for example, as disclosed in U.S. Pat. Nos. 3,404,134, 3,344,014, 7,297,407B2, 7,445,683B2, 7,763,360B2, 7,951,865B1, 7,960,017B2, 8,399,097B2, 8,399,098B2, US2015/0158986A1, US2016/0167348A1, WO2016/076336A1, WO2016/076337A1, WO2016/076338A1, WO2016/076339A1, WO2016/076340A1, US2017/0320297A1 and US20190030863A1.

Ionomer-based interlayers have been shown to exhibit excellent performance in hurricane-resistant glazing. Glass laminates made with ionomer interlayers can effectively mitigate damage from wind-borne debris and resist high-velocity winds associated with hurricanes (see, for example, U.S. Pat. No. 7,951,865B1). A key physical property of ionomer-based interlayers is high stiffness that imparts good strength to the laminate and excellent resistance to wind loading after the glass is broken from wind-borne debris. However, high polymer stiffness results in poor acoustic damping and sound barrier performance as compared to softer polymer interlayers. Of course, softer polymers do not perform to the same level as ionomers in hurricane glazing so there is a need to develop interlayer products that enable good hurricane resistance and high sound barrier performance.

Certain ionomer-based multilayer interlayers with improved acoustic properties have been generally disclosed in the literature (see, for example, previously incorporated U.S. Pat. No. 7,297,407B2, US2015/0158986A1, US2016/0167348A1, US2017/0320297A1, US2018/0117883A1, WO2016/076336A1, WO2016/076337A1, WO2016/076338A1 WO2016/076339A1 and WO2016/076340A1), but the exemplified interlayers do not have a sufficient combination of properties to be suitable for use in hurricane-resistant laminated glazing.

In addition, hurricane-resistant glazing is usually employed in climatic zones exhibiting high temperatures and strong sunlight. Therefore, it is beneficial to provide additional functionality to the polymer interlayer that reduces the amount of infra-red solar radiation transmitted through the glazing in order to reduce heat loading of the building interior.

It has now been found that a glass laminate with a multilayer interlayer sheet comprising ionomers as well as thermoplastic elastomers can be made, which exhibits improved impact and shatter resistance from hurricane-force winds, improved acoustic properties and optionally solar heat resistance.

SUMMARY OF THE INVENTION

The present invention provides a multilayer polymeric interlayer which, when laminated between two panes of glass, provides a glass laminate with a desirable combination of sound insulation, flexural strength, stiffness and optical properties, and optionally heat-shielding properties, which allows for protection from wind-borne debris and hurricane-force winds.

In accordance with a first embodiment, the present invention provides a multilayer polymeric interlayer comprising at least three layers, said interlayer having a structure of Layer A/Layer B/Layer C, wherein:
  (1) Layer A is a layer of a first ionomer resin composition,
  (2) Layer C is a layer of a second ionomer resin composition, and
  (3) Layer B is an acoustic damping layer between Layer A and Layer C,
  wherein:
    (i) Layer B comprises one or more layers, at least one of which is a layer of an acoustic damping resin composition;
    (ii) each of Layers A and C is individually from about 0.5 mm to about 2.5 mm thick;
    (iii) Layer B is from about 0.01 mm to about 4.0 mm thick; and
    (iv) the multilayer polymeric interlayer is from about 2 mm to about 5 mm thick.

In a second embodiment, Layer B is a trilayer structure of Layer B1/Layer B2/Layer B3, wherein Layers B1 and B3 comprise, respectively, a third and a fourth ionomer resin composition, and Layer B2 comprises the acoustic damping resin composition.

In one embodiment, the interlayer is substantially 3-dimensional rectangular shaped (non-wedge shaped).

In another embodiment, each of the first, second, third and fourth ionomer resin compositions individually can be the same as or different from one another; or the first and second ionomer resin compositions are the same; or the third and fourth resin ionomer compositions are the same; or the first, second, third and fourth ionomer resin compositions are the same.

In another embodiment, the acoustic damping resin composition and/or Layer B is substantially free of plasticizer, or free of plasticizer; and/or Layer B (as a single layer) and/or Layer B2 is selected from the group consisting of an ethylene-vinyl acetate resin composition and a thermoplastic elastomer resin composition, or is a thermoplastic elastomer resin composition.

When the polymeric interlayer is used in a glass laminate, the present invention provides a glass laminate that exhibits a sound barrier performance of at least a sound transmission classification (STC) of at least 40 as measured according to ASTM E90-2016, and passes a large-missile impact and pressure cycling hurricane resistance test measured according to ASTM E1996-2017, as described in further detail below.

In another embodiment, the present invention provides a glass laminate that exhibits a sound transmission classification (STC) of at least 40 as measured according to ASTM E90-2016 and analyzed following ASTM E413-10, and passes the positive pressure section of hurricane resistance test to a peak pressure of 6.22 kPa as measured according to ASTM E1996-2017, as described in further detail below.

Optionally, infrared and/or UV absorbing materials can be included in one or more layers of the multilayer interlayer.

Thus, the laminates in accordance with the present invention provide a desirable combination of sound insulating, flexural strength, stiffness and optical properties, and desirably solar heat shielding properties, suitable for use in a variety of high-impact end uses such as, for example, hurricane-resistant acoustic glazing.

These and other embodiments, features and advantages of the present invention will be more readily understood by those of ordinary skill in the art from a reading of the following detailed description.

BRIEF DESCRIPTION OF THE DRAWINGS

FIG. 2 is a diagram representing a second embodiment of the present invention. A glass-interlayer laminate (20) comprises layers of glass (100), between which are layers of polymers. Layers A (200) and C (400) comprise "stiff" materials (e.g., first and second ionomer resin compositions). Layers B1 (325) and B3 (375) also comprise "stiff" materials (e.g., third and fourth ionomer resin compositions), and Layer B2 (375) comprises an acoustic damping material (e.g., acoustic damping resin composition).

DETAILED DESCRIPTION

Figure 1:
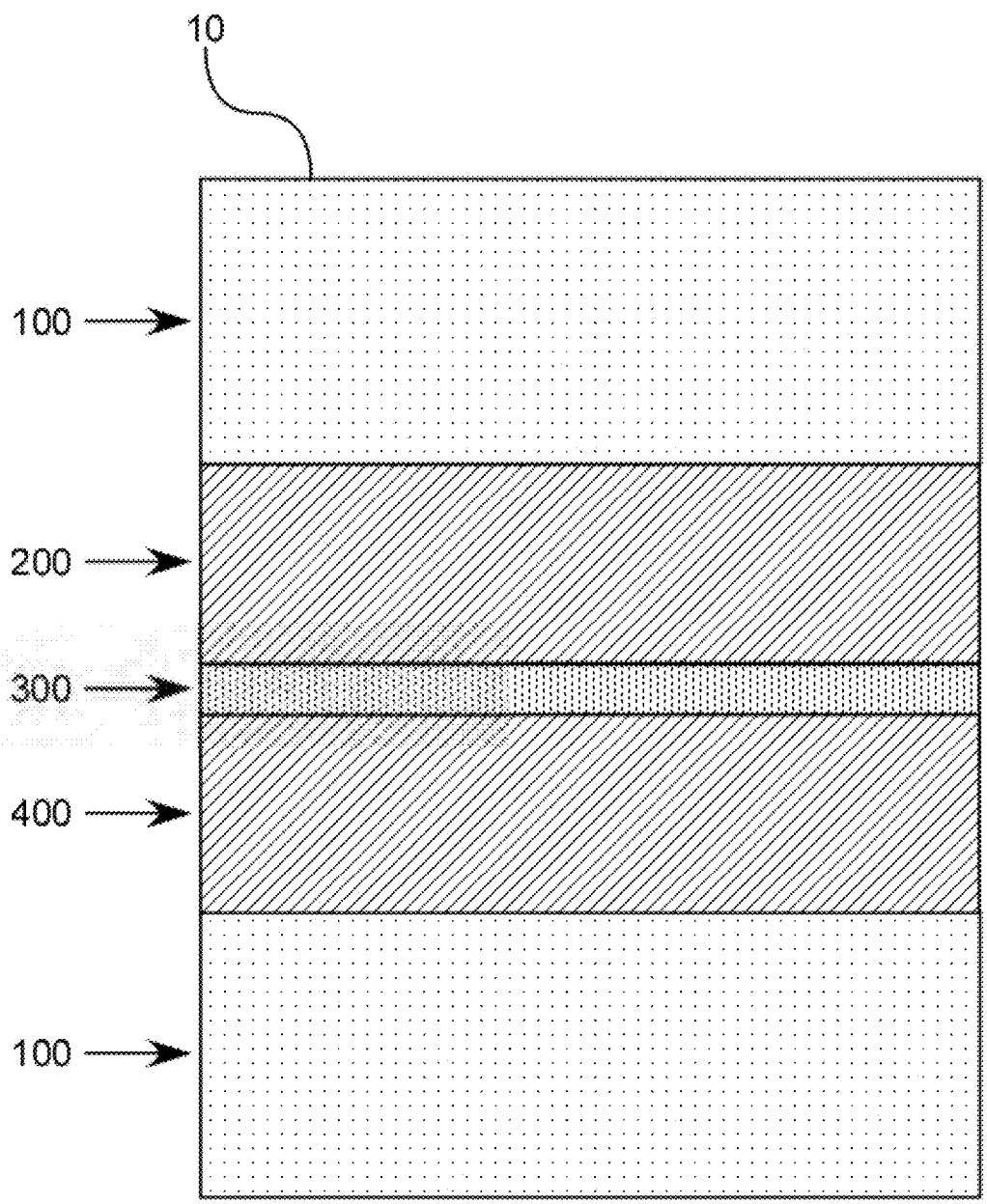
FIG. 1 is a diagram representing a first embodiment of the present invention. A glass-interlayer laminate (10) comprises layers of glass (100), between which are layers of polymers. Layers A (200) and C (400) comprise "stiff" materials (e.g., first and second ionomer resin compositions). Layer B (300) comprises an acoustic damping material (e.g., acoustic damping resin composition).

The present invention relates to a multilayer interlayer, a glass laminate containing such multilayer interlayer and various end uses of such glass laminate. Further details are provided below.

The following definitions apply to the terms as used throughout this specification, unless otherwise limited in specific instances.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this invention belongs. In case of conflict, the specification, including definitions, will control.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a 'consisting of' format and fully open claims that are drafted in a "comprising" format. Optional additives as defined herein, at levels that are appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of the elements of" the composition, the process, the structure, or the portion of the composition, the process, or the structure.

The term "substantially free", or "substantially no additional" as used herein with respect to a composition and a component, refers to a composition that includes no more than an adventitious amount of the component. Stated alternatively, the composition includes no added amount of the component, only the amount that is commonly present in the raw materials from which the composition is produced. In some commercially available materials, the level of adventitious components is less than about 0.5%, or less than about 0.1%, by weight, based on the weight of the commercially available material.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "or", as used herein, in inclusive; that is, the phrase "A or B" means "A, B, or both A and B". More specifically, a condition "A or B" is satisfied by any one of the following: A is true (or present) and B is false (or not present); A is false (or not present), and B is true (or present); or both A and B are true (or present). Exclusive "or" is designated herein by terms such as "either A or B" and "one of A or B", for example.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 weight % of acrylic acid", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

The term "dipolymer" refers to polymers consisting essentially of two monomers, and the term "terpolymer" refers to polymers comprising at least three monomers.

The term "acid copolymer" as used herein refers to a copolymer comprising copolymerized units of an α-olefin, an α,β-ethylenically unsaturated carboxylic acid, and optionally other suitable comonomer(s) such as, an α,β-ethylenically unsaturated carboxylic acid ester.

The term "(meth)acrylic", as used herein, alone or in combined form, such as "(meth)acrylate", refers to acrylic or methacrylic, for example, "acrylic acid or methacrylic acid", or "alkyl acrylate or alkyl methacrylate".

The term "ionomer" as used herein refers to a polymer that comprises ionic groups that are carboxylate salts, for example, ammonium carboxylates, alkali metal carboxylates, alkaline earth carboxylates, transition metal carboxylaces and/or combinations of such carboxylates. Such polymers are generally produced by partially or fully neutralizing the carboxylic acid groups of precursor or parent polymers that are acid copolymers, as defined herein, for example by reaction with a base. An example of an alkali metal ionomer as used herein is a sodium ionomer, for example a copolymer of ethylene and methacrylic acid wherein all or a portion of the carboxylic acid groups of the copolymerized methacrylic acid units are in the form of sodium carboxylates. An example of a mixed metal ionomer as used herein is a zinc/sodium ionomer (or zinc/sodium neutralized mixed ionomer), for example a copolymer of ethylene and methacrylic acid wherein all or a portion of the carboxylic acid groups of the copolymerized methacrylic acid units are in the form of zinc carboxylates and sodium carboxylates. Ionomers are also sometimes also referred to in the literature as ionoplasts.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the invention is not limited to the specific values recited when defining a range.

The term "ethylene vinyl acetate" as used herein refers to a copolymer which is about 4 wt % to about 70 wt % vinyl acetate, with the remainder being ethylene and optionally minor amounts of one or more other comonomers. It can be also referred to as thermoplastic ethylene-vinyl acetate copolymer.

The terms "film" and "sheet", while interchangeable, can each be defined in terms of their thickness, although there is no set industry standard. As sometimes used herein, the term "film" may refer to a structure having a thickness of about 10 mils (0.25 mm) or less, and the term "sheet" may refer to a structure having a thickness of greater than about 10 mils (0.25 mm). Other meanings (thicknesses) may be given in the context of specific embodiments.

The term "substantially 3-dimensional rectangular shaped" means not a "wedge" as that term is understood by persons of ordinary skill in the relevant art (see, for example, US2018/0117883A1), or generally where all edges are substantially right angles. Any variance is usually within conventional manufacturing tolerances, as would be understood by a person of ordinary skill in the relevant art.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

Unless stated otherwise, all percentages, parts, ratios and like amounts, are defined by weight.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Provided herein are polymeric interlayers, comprising at least three layers, having a structure of Layer A/Layer B/Layer C, wherein Layers A and C comprise polymers which exhibit relatively "stiff" properties and "good" toughness, and Layer B comprises a polymer which exhibits "good" acoustic properties. As used herein, the term "stiff" properties means a Young's modulus of at least 100 MPa as measured by ISO-527. As used herein, the term "good" toughness means polymers (as measured by ISO-527) with:

a) a yield stress of at least 15 MPa, b) an ultimate tensile strength of at least 30 MPa, and c) an elongation to break of greater than 200%. As used herein, the term "good" acoustic properties, means a storage shear modulus of less than 100 MPa and a Tan Delta (tan δ) (damping) of greater than 1 determined at 1,000 Hz and 20° C. (as measured by ASTM D4065-12—Shear Geometry).

Polymers which exhibit "stiff" properties and "good" toughness include, but are not limited to, ionomers. When used in multilayers in glass laminates, these polymers can enable laminates to pass a hurricane resistance test measured according to ASTM E1996-2017.

Polymers which exhibit good acoustic properties include, but are not limited to, polyvinyl acetals such as polyvinyl butyrates (PVB), thermoplastic elastomers and ethylene vinyl acetate (EVA). When used in multilayers in glass laminates with two plies of 6 mm thickness glass, these acoustic polymers can enable the laminates to achieve sound transmission classifications of 40 and above, when measured according to ASTM E90-2016 and analyzed using ASTM E413-2010. The practical upper limit of STC is generally about 55, or about 51, or about 50.

Additional information regarding "stiff" and acoustic polymers suitable for use in the present invention, their properties, as well as the properties of the glass laminates comprising them, will be found below.

Further provided herein are multilayer polymeric interlayers of a specified minimum and maximum thickness comprising an acoustic damping layer which is sandwiched between at least two ionomer layers, which two ionomers layers can be the same or different.

In one embodiment, the acoustic damping layer is comprised of at least three layers, including at least one that comprises an acoustic damping resin composition, which is sandwiched between at least two layers comprising ionomer resin compositions, which can be the same or different.

In another embodiment, the Layer B is itself a multilayer construction with at least one acoustic damping layer sandwiched between at least two additional ionomer skin layers, which can also be the same or different from each other as well as different from the any other ionomer layers, to form a multilayer polymeric interlayer which comprises at least five layers.

The multilayer polymeric interlayers of the present invention are from about 2 mm to about 5 mm, or to about 4 mm, or to about 3 mm, or to about 2.3 mm, in total thickness, and/or a desirably substantially 3-dimensional rectangular shaped (as defined above).

The multilayer polymeric interlayers generally described above, and more fully described below, may also comprise one or more infrared and/or UV absorbing materials, as well as heat-shielding fine particles. These materials provide laminates with improved solar barrier properties.

The present invention also provides laminates comprising the multilayer polymeric interlayers. Generally, these laminates are glass laminates that are formed by known lamination processes, and use glass (inorganic or organic) having a thickness of from about 3 mm, or from about 5 mm, to about 12 mm. A typical thickness is about 6 mm. The laminates thus formed have total thicknesses of from about 8 mm, or from about 10 mm, or form about 12 mm, to about 25 mm, or to about 20 mm, or to about 15 mm. A typical total thickness is about 14.3 mm.

In one embodiment of the present invention, as shown in FIG. 1, Layer B is generally comprised of one layer (300) with excellent acoustic damping properties.

In general, the layer of the acoustic damping resin composition desirably has a modulus of from about 10 MPa to about 100 MPa and Tan Delta (tan δ) (damping) of from about 1.0 to about 2.0 as measured by ASTM D4065-12—Shear Geometry at 1,000 Hz and 20° C.

The acoustic damping layer comprises an acoustic damping resin composition, which comprises an acoustic damping resin and one or more optional additives. Non-limiting examples of suitable acoustic damping resins include ethylene vinyl acetates (EVA), which may be crosslinked or uncrosslinked in the interlayer; polyvinyl acetals, specifically polyvinyl butyrals (PVB); and thermoplastic elastomers such as tri-block copolymers having, for example, polystyrene end blocks and vinyl bonded rich poly-diene mid-block, such as Hybrar™ thermoplastic elastomers (commercially available from Kuraray Co., Ltd., Tokyo, Japan).

In the embodiment of FIG. 1, Layer B preferably has a thickness of about 0.01 mm or more, or about 0.02 mm or more, or about 0.025 mm or more, or about 0.3 mm or more, or about 0.05 mm or more, or about 0.1 mm or more. In addition, the thickness of the layer B is preferably about 0.5 mm or less, or about 0.4 mm or less, or about 0.3 mm or less.

In the embodiment of FIG. 1, the combined thickness of Layers A (200) and C (400) is the total thickness of the multilayer polymer interlayer less the thickness of Layer B (300). Each Layer A and C can individually have a thickness of from about 0.25 mm, or from about 0.5 mm, to about 4 mm, or to about 3 mm, or to about 2.5 mm, so long as the combination of Layer A+Layer B+Layer C adds up to the desired total thickness of the multilayer polymer interlayer.

Layers A and C can be comprised of the same or different polymers that generally exhibit good stiffness and toughness thus imparting improved hurricane-level impact and cycling. These polymers have a modulus of from about 100 MPa to about 1000 MPa as measured by ISO-527.

According to another embodiment of the present invention, as shown in FIG. 2, the polymeric interlayer is comprised of at least five layers. In this embodiment, Layer B (300) is multilayer in nature, having a structure represented by Layer B1 (325)+Layer B2 (350)+Layer B3 (375).

Layer B2 desirably comprises the acoustic damping polymer composition as generally described above. In the embodiment of FIG. 2, Layer B2 preferably has a thickness of about 0.01 mm or more, or about 0.02 mm or more, or about 0.025 mm or more, or about 0.3 mm or more, or about 0.05 mm or more, or about 0.1 mm or more. In addition, the thickness of the layer B is preferably about 0.5 mm or less, or about 0.4 mm or less, or about 0.3 mm or less. In one embodiment, Layer B2 is from about 0.01 mm to about 0.03 mm thick, typically about 0.02 mm thick.

Specifically, Layers B1 and B3 are, respectively, third and fourth ionomer resin compositions comprising, respectively, third and fourth ionomer resins and optionally one or more additives. The thickness of Layers B1 and B3 are each individually generally from about 0.25 mm to about 1.0 mm, and can be the same or different.

The combined thickness of Layer B1+Layer B2+Layer B3 is generally about 0.5 mm or more, or about 0.6 mm or more, to about 2 mm or less, or to about 1.5 mm or less, or to about 1.25 mm or less, or to about 1 mm or less.

In the embodiment of FIG. 2, the combined thickness of Layers A and C is the total thickness of the multilayer polymer interlayer less the thickness of combined Layer B. Each Layer A and C can individually have a thickness of from about 0.25 mm, or from about 0.5 mm, to about 4 mm, or to about 3 mm, or to about 2.5 mm, so long as the combination of Layer A+combined Layer B+Layer C adds up to the desired total thickness of the multilayer polymer interlayer.

In one embodiment, the acoustic damping layer is substantially centered within the multilayer polymer interlayer. In another embodiment, the acoustic damping layer is offset from the center toward one of the edges.

Desirably, the acoustic damping layer (and the multilayer polymer interlayer as a whole) should contain no substantially no plasticizers, or no plasticizers, for the resins used in such layers. Consequently, thermoplastic elastomer resin and EVA resins are preferred for the acoustic damping layer, and these resins will now be described more fully as follows.

Thermoplastic Elastomer

Thermoplastic elastomers can be used in the multilayer polymeric interlayer as described above. These materials generally provide polymeric interlayer sheets and laminates comprising these sheets with improved acoustic properties, as described in US2017/0320297A1. Generally speaking, these materials, also referred to as "elastomers", generally include materials with soft and hard segments, such as a polystyrene-based elastomer (soft segment: polybutadiene, polyisoprene/hard segment: polystyrene), a polyolefin-based elastomer (soft segment: ethylene propylene rubber/hard segment: polypropylene), a polyvinyl chloride-based elastomer (soft segment: polyvinyl chloride/hard segment: polyvinyl chloride), a polyurethane-based elastomer (soft segment: polyether, polyester, or polycarbonate/hard segment: polyurethane), a polyester-based elastomer (soft segment: aliphatic polyester/hard segment: aromatic polyester), a polyether ester-based elastomer (soft segment: polyether/hard segment: polyester), a polyamide-based elastomer (soft segment: polypropylene glycol, polytetramethylene ether glycol, polyester, or polyether/hard segment: polyamide (such as a nylon resin)), a polybutadiene-based elastomer (soft segment: amorphous butyl rubber/hard segment: syndiotactic 1,2-polybutadiene resin), an acrylic elastomer (soft segment: polyacrylate ester/hard segment: polymethyl methacrylate). It is to be noted that the above-described thermoplastic elastomers may be used solely or may be used in combination of two or more thereof.

A content of the hard segment in the thermoplastic elastomer is preferably about 5% by mass or more, or about 7% by mass or more, or about 8% by mass or more, or about 10% by mass or more, or about 14% by mass or more, or about 16% by mass or more, or about 18% by mass or more, relative to the total amount of the thermoplastic elastomer. A content of the hard segment is preferably about 40% by mass or less, or about 30% by mass or less, or about 20% by mass or less, relative to the total amount of the thermoplastic elastomer. When the content of the hard segment is less than about 5% by mass, there is a tendency for the molding of the layer B to be difficult, the height of the peak of tan δ is small, the flexural rigidity of the laminate is small, or the sound insulating properties in a high-frequency region is lowered. When the content of the hard segment is more than about 40% by mass, there is a tendency for the characteristics of the thermoplastic elastomer to be hardly exhibited, the stability of sound insulating performance is lowered, or the sound insulating characteristics in the vicinity of room temperature are lowered.

A content of the soft segment in the thermoplastic elastomer is preferably about 60% by mass or more, or about 70% by mass or more, or about 80% by mass or more, relative to the total amount of the thermoplastic elastomer. The content of the soft segment is preferably about 95% by mass or less, or about 92% by mass or less, or about 90% by mass or less, or about 88% by mass or less, or about 86% by mass or less, or about 84% by mass or less, or about 82% by mass or less relative to the total amount of the thermoplastic elastomer. When the content of the soft segment is less than about 60% by mass, the characteristics of the thermoplastic elastomer tend to be hardly exhibited. When the content of the soft segment is more than about 95% by mass, there is a tendency that the molding of the layer B is difficult, the height of the peak of tan δ is small, the flexural rigidity of the laminate is small, or the sound insulating properties in a high-frequency region are lowered. Here, in the case where a plurality of the thermoplastic elastomers is mixed, the contents of the hard segment and the soft segment in the thermoplastic elastomer are each considered as an average value of the mixture.

From the viewpoint of making both the moldability and the sound insulating properties compatible with each other, it is more preferred to use a block copolymer having a hard segment and a soft segment as the thermoplastic elastomer. Furthermore, from the viewpoint of further improving the sound insulating properties, it is preferred to use a polystyrene-based elastomer.

In addition, crosslinked rubbers of natural rubber, isoprene rubber, butadiene rubber, chloroprene rubber, nitrile rubber, butyl rubber, ethylene propylene rubber, urethane rubber, silicone rubber, chlorosulfonated polyethylene rubber, acrylic rubber, fluorine rubber, and the like may be used as the thermoplastic elastomer.

The thermoplastic elastomer is preferably a copolymer of an aromatic vinyl monomer and a vinyl monomer or a conjugated diene monomer, or a hydrogenated product of the copolymer. From the viewpoint of making both the function as a rubber exhibiting sound insulating properties and the function as a plastic compatible with each other, the copolymer is preferably a block copolymer having an aromatic vinyl polymer block and an aliphatic unsaturated hydrocarbon polymer block, for example, a polystyrene-based elastomer.

In the case where a copolymer having an aromatic vinyl polymer block and a vinyl polymer block or a conjugated diene polymer block, for example, a block copolymer having an aromatic vinyl polymer block and an aliphatic unsaturated hydrocarbon polymer block is used as the thermoplastic elastomer, the binding form of these polymer blocks is not particularly limited, and it may be any of a linear binding form, a branched binding form, a radial binding form, and a combined binding form of two or more thereof. Of those, a linear binding form is preferred.

When the aromatic vinyl polymer block is expressed as "a", and the aliphatic unsaturated hydrocarbon polymer block is expressed as "b", examples of the linear binding form include a diblock copolymer expressed by a-b, a triblock copolymer expressed by a-b-a or b-a-b, a tetrablock copolymer expressed by a-b-a-b, a pentablock copolymer expressed by a-b-a-b-a or b-a-b-a-b, an (a-b)$_n$X type copolymer (X represents a coupling residual group, and n represents an integer of 2 or more), and a mixture thereof. Of those, a diblock copolymer or a triblock copolymer is preferred, and the triblock copolymer is more preferably a triblock copolymer expressed by a-b-a.

A sum total of an aromatic vinyl monomer unit and an aliphatic unsaturated hydrocarbon monomer unit in the block copolymer is preferably about 80% by mass or more, or about 95% by mass or more, or about 98% by mass or more relative to the whole of the monomer units. It is to be noted that a part or the whole of the aliphatic unsaturated hydrocarbon polymer blocks in the block copolymer may be hydrogenated.

A content of the aromatic vinyl monomer unit in the block copolymer is preferably about 5% by mass or more, or about 7% by mass or more, or about 8% by mass or more, or about 14% by mass or more, or about 16% by mass or more, or about 18% by mass or more, relative to the whole of the monomer units of the block copolymer. A content of the aromatic vinyl monomer unit is preferably about 40% by mass or less, or about 30% by mass or less, or about 25% by mass or less, or about 20% by mass or less, relative to the whole of the monomer units of the block copolymer.

When the content of the aromatic vinyl monomer unit in the block copolymer is less than about 5% by mass, there is a tendency that the molding of the layer A is difficult, a deviation of glasses is caused due to heat, the height of the peak of tan δ is small, the flexural rigidity of the laminate is small, or the sound insulating properties in a high-frequency region are lowered. When the content of the aromatic vinyl monomer unit in the block copolymer is more than about 40% by mass, there is a tendency that the characteristics as the thermoplastic elastomer are hardly exhibited, or the stability of sound insulating performance is lowered.

The content of the aromatic vinyl monomer unit in the block copolymer can be determined from a charge ratio of the respective monomers in synthesizing the block copolymer, or the measurement results of $^1$H-NMR or the like of the block copolymer. Here, in the case where a plurality of the block copolymers is mixed, the content of the aromatic vinyl monomer unit in the block copolymer is considered as an average value of the mixture.

In the aromatic vinyl polymer block, a monomer other than the aromatic vinyl monomer may be copolymerized so long as its amount is small. A proportion of the aromatic vinyl monomer unit in the aromatic vinyl polymer block is preferably about 80% by mass or more, or about 95% by mass or more, or about 98% by mass or more relative to the whole of the monomer units in the aromatic vinyl polymer block.

Examples of the aromatic vinyl monomer constituting the aromatic vinyl polymer block include styrene; alkylstyrenes, such as α-methylstyrene, 2-methylstyrene, 3-methylstyrene, 4-methylstyrene, 4-propylstyrene, 4-cyclohexylstyrene and 4-dodecylstyrene; arylstyrenes, such as 2-ethyl-4-benzylstyrene, 4-(phenylbutyl)styrene, 1-vinylnaphthalene and 2-vinylnaphthalene; halogenated styrenes; alkoxystyrenes; vinylbenzoate esters; and the like. These aromatic vinyl monomers may be used solely or may be used in combination of two or more thereof.

A content of the aliphatic unsaturated hydrocarbon monomer unit in the block copolymer is preferably about 60% by mass or more, or about 70% by mass or more, or about 75% by mass or more, or 80% by mass or more, relative to the whole of the monomer units of the block copolymer. The content of the aliphatic unsaturated hydrocarbon monomer unit in the block copolymer is preferably about 95% by mass or less, or about 92% by mass or less, or about 90% by mass or less, or about 88% by mass or less, or about 86% by mass or less, or about 84% by mass or less, or about 82% by mass or less, relative to the whole of the monomer units of the block copolymer.

When the content of the aliphatic unsaturated hydrocarbon monomer unit in the block copolymer is less than about 60% by mass, there is a tendency that the characteristics as the thermoplastic elastomer are hardly exhibited, or the stability of sound insulating performance is lowered. When the content of the aliphatic unsaturated hydrocarbon monomer unit in the block copolymer is more than about 95% by mass, there is a tendency that the molding of the layer B is difficult, the height of the peak of tan δ is small, the flexural rigidity of the laminate is small, or the sound insulating properties in a high-frequency region are lowered.

The content of the aliphatic unsaturated hydrocarbon monomer unit in the block copolymer can be determined from a charge ratio of the respective monomers in synthesizing the block copolymer, or the measurement results of $^1$H-NMR or the like of the block copolymer. Here, in the case where a plurality of the block copolymers is mixed, the content of the aliphatic unsaturated hydrocarbon monomer unit in the block copolymer is considered as an average value of the mixture.

In the aliphatic unsaturated hydrocarbon polymer block, a monomer other than the aliphatic unsaturated hydrocarbon monomer may be copolymerized so long as its amount is small. A proportion of the aliphatic unsaturated hydrocarbon monomer unit in the aliphatic unsaturated hydrocarbon polymer block is preferably about 80% by mass or more, or about 95% by mass or more, or about 98% by mass or more, relative to the whole of the monomer units in the aliphatic unsaturated hydrocarbon polymer block.

Examples of the aliphatic unsaturated hydrocarbon monomer constituting the aliphatic unsaturated hydrocarbon polymer block include ethylene, propylene, 1-butene, 1-pentene, 1-hexene, 1-heptene, 1-octene, 1-nonene, 1-decene, 4-phenyl-1-butene, 6-phenyl-1-hexene, 3-methyl-1-butene, 4-methyl-1-butene, 3-methyl-1-pentene, 4-methyl-1-pentene, 3-methyl-1-hexene, 4-methyl-1-hexene, 5-methyl-1-hexene, 3,3-dimethyl-1-pentene, 3,4-dimethyl-1-pentene, 4,4-dimethyl-1-pentene, vinylcyclohexane, hexafluoropropene, tetrafluoroethylene, 2-fluoropropene, fluoroethylene, 1,1-difluoroethylene, 3-fluoropropene, trifluoroethylene, 3,4-dichloro-1-butene, butadiene, isoprene, dicyclopentadiene, norbornene, acetylene, and the like. These aliphatic unsaturated hydrocarbon monomers may be used solely or may be used in combination of two or more thereof.

From the viewpoints of ease of availability and handling properties, the aliphatic unsaturated hydrocarbon monomer is preferably an aliphatic unsaturated hydrocarbon having 2 or more carbon atoms, or an aliphatic hydrocarbon having 4 or more carbon atoms, and is preferably an aliphatic unsaturated hydrocarbon having 12 or less carbon atoms, or an aliphatic hydrocarbon having 8 or less carbon atoms. Among those, butadiene, isoprene, and a combination of butadiene and isoprene are preferred.

In addition, from the viewpoints of easiness of availability and handling properties as well as easiness of synthesis, the aliphatic unsaturated hydrocarbon monomer is preferably a conjugated diene. From the viewpoint of improving the heat stability, in the case of using a conjugated diene as the constituent unit of the aliphatic unsaturated hydrocarbon polymer block, the conjugated diene is preferably a hydrogenated product resulting from hydrogenating a part or the whole thereof. On that occasion, a hydrogenation ratio is preferably 80% or more, or 90% or more. The hydrogenation ratio as referred to herein is a value obtained by measuring an iodine value of the block copolymer before and after the hydrogenation reaction.

From the viewpoints of mechanical characteristics and molding processability, a weight average molecular weight of the block copolymer is preferably about 30,000 or more, or about 50,000 or more and preferably about 400,000 or less, or about 300,000 or less. A ratio (Mw/Mn) of weight average molecular weight to number average molecular weight of the block copolymer is preferably about 1.0 or more, and preferably about 2.0 or less, or about 1.5 or less. Here, the weight average molecular weight refers to a weight average molecular weight as reduced into polystyrene as determined by the gel permeation chromatography (GPC) measurement, and the number average molecular weight refers to a number average molecular weight as reduced into polystyrene as determined by the GPC measurement.

Though a production method of the block copolymer is not particularly limited, the block copolymer can be, for example, produced by an anionic polymerization method, a cationic polymerization method, a radical polymerization method, or the like. For example, in the case of anionic polymerization, specific examples thereof include:

(i) a method of successively polymerizing an aromatic vinyl monomer, a conjugated diene monomer, and subsequently an aromatic vinyl monomer by using an alkyllithium compound as an initiator;

(ii) a method of successively polymerizing an aromatic vinyl monomer and a conjugated diene monomer by using an alkyllithium compound as an initiator and subsequently adding a coupling agent to undergo coupling;

(iii) a method of successively polymerizing a conjugated diene monomer and subsequently an aromatic vinyl monomer by using a dilithium compound as an initiator;

and the like.

In the case of using a conjugated diene as the aliphatic unsaturated hydrocarbon monomer, by adding an organic Lewis base on the occasion of anionic polymerization, a 1,2-bond quantity and a 3,4-bond quantity of the thermoplastic elastomer can be increased, and the 1,2-bond quantity and the 3,4-bond quantity of the thermoplastic elastomer can be easily controlled by the addition amount of the organic Lewis base. By controlling them, the peak temperature or height of tan δ can be adjusted.

Examples of the organic Lewis base include esters, such as ethyl acetate; amines, such as triethylamine, N,N,N',N'-tetramethylethylenediamine (TMEDA) and N-methylmorpholine; nitrogen-containing heterocyclic aromatic compounds, such as pyridine; amides, such as dimethylacetamide; ethers, such as dimethyl ether, diethyl ether, tetrahydrofuran (THF) and dioxane; glycol ethers, such as ethylene glycol dimethyl ether and diethylene glycol dimethyl ether; sulfoxides, such as dimethyl sulfoxide; ketones, such as acetone and methyl ethyl ketone; and the like.

In the case of subjecting the unhydrogenated polystyrene-based elastomer to a hydrogenation reaction, the hydrogenation reaction can be conducted by dissolving the obtained unhydrogenated polystyrene-based elastomer in a solvent inert to a hydrogenation catalyst, or allowing the unhydrogenated polystyrene-based elastomer to react directly with hydrogen without being isolated from a reaction liquid in the presence of a hydrogenation catalyst. The hydrogenation ratio is preferably about 60% or more, or about 80% or more, or about 90% or more.

Examples of the hydrogenation catalyst include Raney nickel; heterogeneous catalysts in which a metal, such as Pt, Pd, Ru, Rh and/or Ni, is supported on a carrier, such as carbon, alumina and/or diatomaceous earth; Ziegler-based catalysts composed of a combination of a transition metal compound with an alkylaluminum compound and/or an alkyllithium compound; metallocene-based catalysts; and the like. The hydrogenation reaction can be generally conducted under conditions at a hydrogen pressure of about 0.1 MPa or more and about 20 MPa or less and at a reaction temperature of about 20° C. or higher and about 250° C. or lower for a reaction time of about 0.1 hours or more and about 100 hours or less.

In a preferred embodiment, the thermoplastic elastomer has a sea-island phase separated structure in which the hard segment block is included as an island component and the soft segment block is included as a sea component. It has been found that the phase separation size of an island component is sometimes increased in a layer to be used in an interlayer for a laminated glass, and therefore, the interlayer for a laminated glass shrinks when producing a laminated glass or the haze of the laminated glass is decreased, and also found that a laminated glass using an interlayer for a laminated glass having a specific structure has excellent sound insulating properties even when the thickness is reduced and also has low shrinkability.

More specifically in this embodiment, the thermoplastic elastomer includes a hard segment block and a soft segment block, and the layer B has a sea-island phase separated structure in which the hard segment block is included as an island component and the soft segment block is included as a sea component, and when the degree of orientation (1) is defined by the following formula (I) based on the maximum intensity value and the minimum intensity value in an arbitrary azimuth range of 180° including the azimuth at which the intensity reaches the maximum in the azimuthal intensity distribution of periodic scattering or coherent scattering by the hard segment block or the soft segment block obtained for the layer A by small-angle X-ray scattering measurement, the degree of orientation (1) is about 0.9 or less.

Degree of orientation (1)=(maximum intensity value−minimum intensity value)/(maximum intensity value+minimum intensity value)  (I)

It is preferred that the degree of orientation (2), as defined by the following formula (II), is about 10 or less.

Degree of orientation (2)=maximum intensity value/ minimum intensity value  (II)

It is also preferred that, when an island component having a largest major axis size is selected from the island components having a substantially elliptical shape or a substantially continuous linear shape in each phase image obtained by observation with an atomic force microscope of a region in the range of 200 nm×200 nm at arbitrary 5 sites on a sliced surface obtained by slicing a central area in the thickness direction of the layer B along a plane substantially parallel to the layer B, the average of the major axis size of the selected island components is about 100 nm or less.

Specific examples of suitable thermoplastic elastomers can be found, for example, by reference to US2010239802A1.

In one preferred embodiment, the thermoplastic elastomer is a hydrogenated block copolymer formed by hydrogenating a block copolymer comprising at least a polymer block (A) constituted predominantly from an aromatic vinyl compound unit and a polymer block (B) constituted predominantly from a 1,3-butadiene unit or constituted predominantly from an isoprene unit and a 1,3-butadiene unit, wherein a content of the polymer block (A) is from about 5% to about 40% mass on the basis of a total amount of the hydrogenated block copolymer, wherein the polymer block (B) has a hydrogenation rate of about 70% or more, and wherein the hydrogenated block copolymer has a glass transition temperature of from about −45° C. to about 30° C.

In another preferred embodiment, the thermoplastic elastomer is a hydrogenated block copolymer formed by hydrogenating a block copolymer comprising at least a polymer block (C) constituted predominantly from an aromatic vinyl compound unit and a polymer block (D) constituted predominantly from a 1,3-butadiene unit or constituted predominantly from an isoprene unit and a 1,3-butadiene unit, wherein a content of the polymer block (C) is from about 10% to about 40% mass on the basis of a total amount of the hydrogenated block copolymer, wherein the polymer block (D) has a hydrogenation rate of about 80% or more, and wherein the hydrogenated block copolymer has a glass transition temperature of less than about −45° C.

In the above two preferred embodiments, desirably the aromatic vinyl compound is styrene, and/or the polymer block (B) and (D) are constituted predominantly from an isoprene unit and a 1,3-butadiene unit, and/or the hydrogenated block copolymer is a tri-block copolymer having an A1-B-A2 or C1-D-C2 type structure.

In one embodiment, the acoustic damping resin composition contains two or more thermoplastic elastomers having a different peak temperature of tan δ (a temperature of the peak at which the tan δ is maximum) from each other.

Ethylene Vinyl Acetate (EVA)

In the present invention, the acoustic damping layer can be an ethylene vinyl acetate (EVA)-type material, such as disclosed in US2016/0167348A1. Preferably, the EVA material comprises ethylene vinyl acetate having a vinyl acetate content of greater than about 25 wt %, or from about 30 wt %, to about 40 wt %, or to about 35 wt %, or about 33 wt %; an initial melt flow index of at least about 14 g/10 min, and a final melt flow index of about 2 g/10 min or lower, or about 1.5 g/10 min or lower, after the material is cross-linked by one or more methods known to those of ordinary skill in the relevant art (for example, thermally crosslinked with the aid of a peroxide crosslinker).

Ionomer

In accordance with the present invention, the ionomer resin is a partially-neutralized ethylene α,β-unsaturated carboxylic acid copolymer, which includes resins having constituent units derived from ethylene, constituent units derived from an α,β-unsaturated carboxylic acid and optionally other constituent units as described below, in which at least a part of the constituent units derived from the α,β-unsaturated carboxylic acid are neutralized with an ion.

In the ethylene α,β-unsaturated carboxylic acid copolymer serving as a base polymer, a content proportion of the constituent units derived from an α,β-unsaturated carboxylic acid is typically 2% by mass or more, or 5% by mass or more (based on total copolymer mass). In addition, the content proportion of the constituent units derived from an α,β-unsaturated carboxylic acid is typically 30% by mass or less (based on total copolymer mass).

Examples of the α,β-unsaturated carboxylic acid constituting the ionomer include, without limitation, acrylic acid, methacrylic acid, itaconic acid, maleic acid, fumaric acid, and mixtures of two or more thereof. In one embodiment, the a,B-ethylenically unsaturated carboxylic acid is selected from acrylic acid, methacrylic acid, and mixtures thereof. In another embodiment, the a,B-ethylenically unsaturated carboxylic acid is methacrylic acid.

The ethylene acid copolymer may further comprise copolymerized units of one or more additional comonomer(s), such as an α,β-ethylenically unsaturated carboxylic acid ester. When present, alkyl esters having 3 to 10, or 3 to 8 carbons, are typically used. Specific examples of suitable esters of unsaturated carboxylic acids include, without limitation, methyl acrylate, methyl methacrylate, ethyl acrylate, ethyl methacrylate, propyl acrylate, propyl methacrylate, isopropyl acrylate, isopropyl methacrylate, n-butyl acrylate, n-butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexylmethacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, dimethyl maleate, diethyl maleate, dibutyl maleate, dimethyl fumarate, diethyl fumarate, dibutyl fumarate, dimethyl fumarate, vinyl acetate, vinyl propionate, and mixtures of two or more thereof. In one embodiment, the additional comonomers are selected from methyl acrylate, methyl methacrylate, n-butyl acrylate, n-butyl methacrylate, isobutyl acrylate, isobutyl methacrylate, glycidyl methacrylate, vinyl acetate, and mixtures of two or more thereof. In another embodiment, the additional comonomer is one or more of n-butyl acrylate, n-butyl methacrylate, isobutyl acrylate and isobutyl methacrylate. In another embodiment, the additional comonomer is one or both of n-butyl acrylate and isobutyl acrylate.

Suitable ethylene acid copolymers have a melt flow rate (MFR) of from about 1, or from about 2, to about 4000 g/10 min, or to 1000 g/10 min, or to about 400 g/10 min, as determined in accordance with ASTM method D1238-89 at 190° C. and 2.16 kg.

Finally, suitable ethylene acid copolymers may be synthesized as described, for example, in U.S. Pat. Nos. 3,404,134, 5,028,674, 6,500,888B2, 6,518,365B1, 8,334,033B2 and 8,399,096B2.

In one embodiment, a method described in U.S. Pat. No. 8,399,096B2 is used, and a sufficiently high level and complementary amount of the derivative of the second α,β-ethylenically unsaturated carboxylic acid is present in the reaction mixture.

To obtain the ionomers, the ethylene acid copolymers are partially neutralized by reaction with one or more bases. An example of a suitable procedure for neutralizing the ethylene acid copolymers is described in U.S. Pat. Nos. 3,404,134 and 6,518,365B1. After neutralization, about 1%, or about 10%, or about 15%, or about 20%, to about 90%, or to about 60%, or to about 55%, or to about 30%, of the hydrogen atoms of carboxylic acid groups present in the ethylene acid copolymer are replaced by other cations. Stated alternatively, about 1%, or about 10%, or about 15%, or about 20%, to about 90%, or to about 60%, or to about 55%, or to about 30%, of the total content of the carboxylic acid groups present in the ethylene acid copolymer are neutralized. In another alternative expression, the acid groups are neutralized to a level of about 1%, or about 10%, or about 15%, or about 20%, to about 90%, or to about 60%, or to about 55%, or to about 30%, based on the total content of carboxylic acid groups present in the ethylene acid copolymers as calculated or measured for the non-neutralized ethylene acid copolymers. The neutralization level can be tailored for the specific end-use.

The ionomers comprise cations as counterions to the carboxylate anions. Suitable cations include any positively charged species that is stable under the conditions in which the ionomer composition is synthesized, processed and used. Suitable cations may be used in combinations of two or more. In some preferred ionomers, the cations are metal cations, which may be monovalent, divalent, trivalent, or multivalent. Useful monovalent metal cations include but are not limited to cations of sodium, potassium, lithium, silver, mercury, copper, and the like. Useful divalent metal cations include but are not limited to cations of beryllium, magnesium, calcium, strontium, barium, copper, cadmium, mercury, tin, lead, iron, cobalt, nickel, zinc, and the like. Useful trivalent metal cations include but are not limited to cations of aluminum, scandium, iron, yttrium, and the like. Useful multivalent metal cations include but are not limited to cations of titanium, zirconium, hafnium, vanadium, tantalum, tungsten, chromium, cerium, iron, and the like. When the metal cation is multivalent, complexing agents such as stearate, oleate, salicylate, and phenolate radicals may be included, as described in U.S. Pat. No. 3,404,134. In another preferred composition, the metal cations used are monovalent or divalent metal cations. Preferred metal cations are sodium, lithium, magnesium, zinc, potassium, and combinations of one or more of these metal cations. In a more preferred composition, the cations are sodium cations, magnesium cations, zinc cations and combinations thereof.

In one embodiment, the counterions to the carboxylate anions in the ionomer are sodium cations, with counterions other than sodium cations be optionally present in small amounts of less than 5 equivalent %, or less than 3 equivalent %, or less than 2 equivalent %, or less than 1 equivalent %, based on the total equivalents of carboxylate groups in the ionomer. In one embodiment, the counterions are substantially sodium ions.

In one embodiment, counterions other than sodium are present in at most "contaminant" amounts, as one would typically find in industrial situations, as would be recognized by persons of ordinary skill in the relevant art.

The resulting neutralized ethylene acid copolymer has a melt index, as determined in accordance with ASTM method D1238-89 at 190° C. and 2.16 kg that is lower than that of the corresponding ethylene acid copolymer. The ionomer's melt index depends on a number of factors, including the melt index of the ethylene acid copolymer, the amount of copolymerized acid, the neutralization level, the identity of the cation and its valency. Moreover, the desired value of the ionomer's melt index may be determined by its intended end use. Typically, however, the ionomer has a melt index of about 1000 g/10 min or less, or about 750 g/10 min or less, or about 500 g/10 min or less, or about 250 g/10 min or less, or about 100 g/10 min or less, or about 50 g/10 min or less, or about 25 g/10 min or less, or about of 20 g/10 min or less, or about 10 g/10 min or less, or about 7.5 g/10 min or less, as determined in accordance with ASTM method D1238-89 at 190° C. and 2.16 kg.

In one embodiment, the ionomer is an at least partially neutralized ethylene acid dipolymer comprising (consisting essentially of) copolymerized units of:
 (i) ethylene, and
 (ii) from about 10 wt %, or from about 15 wt %, or from about 18 wt %, or from about 20 wt %, to about 30 wt %, or to about 25 wt %, or to about 23 wt % or to about 22 wt %, of at least one $\alpha,\beta$-unsaturated carboxylic acid having 3 to 10 carbon atoms,
wherein the weight percentages of the copolymerized units are based on the total weight of the ethylene acid copolymer and the sum of the weight percentages of the copolymerized units is 100 wt %, and wherein at least a portion of carboxylic acid groups of the $\alpha,\beta$-unsaturated carboxylic acid are neutralized to form an ionomer comprising carboxylate groups having counterions.

In one embodiment, the ionomer is an at least partially neutralized ethylene acid terpolymer comprising copolymerized units of:
 (i) ethylene,
 (ii) from about 10 wt %, or from about 15 wt %, or from about 18 wt %, or from about 20 wt %, to about 30 wt %, or to about 25 wt %, or to about 23 wt % or to about 22 wt %, of at least one $\alpha,\beta$-unsaturated carboxylic acid having 3 to 10 carbon atoms,
 (iii) from about 2 wt %, or from about 3 wt %, or from about 4 wt %, or from about 5 wt %, to about 15 wt %, or to about 12 wt %, or to about 11 wt %, or to about 10 wt %, of at least one $\alpha,\beta$-unsaturated carboxylic acid ester having 3 to 10 carbon atoms, and
 (iv) optionally, a derivative of an $\alpha,\beta$-unsaturated carboxylic acid other than (iii) in an amount such that (iii)+(iv) is about 15 wt % or less, or about 12 wt % or less, or about 11 wt % or less,
wherein the weight percentages of the copolymerized units are based on the total weight of the ethylene acid copolymer and the sum of the weight percentages of the copolymerized units is 100 wt %, and wherein at least a portion of carboxylic acid groups of the $\alpha,\beta$-unsaturated carboxylic acid are neutralized to form an ionomer comprising carboxylate groups having counterions.

Such terpolymer ionomers (terionomers) are generally disclosed in WO2015/199750A1 and WO2014/100313A1, as well as in previously incorporated US2017/1320297A1.

In one embodiment of the dipolymer or terpolymer as described above, the $\alpha,\beta$-unsaturated carboxylic acid is methacrylic acid.

In one embodiment of the terpolymer as described above, the $\alpha,\beta$-unsaturated carboxylic acid ester is n-butyl acrylate, isobutyl acrylate or a mixture thereof.

In one embodiment of the terpolymer described above, the copolymer consists essentially of copolymerized units of (i), (ii) and (iii).

Additives

Silanes such as disclosed in US20100108125A1, US20110105681A1 and US20190030863A1, may be used as adhesion modifiers.

Other than the aforementioned silanes and other adhesion modifiers, the composition of the present invention may contain one or more other additives including, for example, an antioxidant, an ultraviolet ray absorber, a photostabilizer, an antiblocking agent, a colorant such as a pigment and/or a dye, a heat shielding material (infrared ray absorber) and the like, or mixtures thereof. Such other additives are in a general sense well known to those of ordinary skill in the relevant art.

Examples of the antioxidant include phenol-based antioxidants, phosphorus-based antioxidants, sulfur-based antioxidants, and the like. Of those, phenol-based antioxidants are preferred, and alkyl-substituted phenol-based antioxidants are especially preferred.

Examples of the phenol-based antioxidant include acrylate-based compounds, such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate; alkyl-substituted phenol-based compounds, such as 2,6-di-t-butyl-4-methylphenol, 2,6-di-t-butyl-4-ethylphenol, octadecyl-3-(3,5-di-t-butyl-4-hydroxyphenyl)propionate, 2,2'-methylene-bis(4-methyl-6-t-butylphenol), 4,4'-butylidene-bis(4-methyl-6-t-butylphenol), 4,4'-butylidene-bis(6-t-butyl-m-cresol), 4,4'-thiobis(3-methyl-6-t-butylphenol), bis(3-cyclohexyl-2-hydroxy-5-methylphenyl)methane, 3,9-bis(2-(3-(3-t-butyl-4-hydroxy-5-methylphenyl)propionyloxy)-1,1-dimethylethyl)-2,4,8,10-tetraoxaspiro[5.5]undecane, 1,1,3-trix(2-methyl-4-hydroxy-5-t-butylphenyl) butane, 1,3,5-trimethyl-2,4,6-tris(3,5-di-t-butyl-4- hydroxybenzyl)benzene, tetrakis(methylene-3-(3',5'-di-t-butyl-4'-hydroxyphenyl)propionate)methane and triethylene glycolbis(3-(3-t-butyl-4-hydroxy-5-methylphenyl)propionate); triazine group-containing phenol-based compounds, such as 1,3,5-tris(2,6-dimethyl-3-hydroxy-4-t-butylbenzyl)-1,3,5-triazine-2,4,6(1H,3H,5H)-trione, 6-(4-hydroxy-3,5-di-t-butylanilino)-2,4-bis-octylthio-1,3,5-triazine, 6-(4-hydroxy-3,5-dimethylanilino)-2,4-bis-octylthio-1,3,5-triazine, 6-(4-hydroxy-3-methyl-5-t-butylanilino)-2,4-bis-octylthio-1,3,5-triazine and 2-octylthio-4,6-bis-(3,5-di-t-butyl-4-oxyanilino)-1,3,5-triazine; and the like.

Examples of the phosphorus-based antioxidant include monophosphite-based compounds, such as triphenyl phosphite, diphenylisodecyl phosphite, phenyldiisodecyl phosphite, tris(nonylphenyl) phosphite, tris(dinonylphenyl) phosphite, tris(2-t-butyl-4-methylphenyl) phosphite, tris(2,4-di-t-butyl) phosphite, tris(cyclohexylphenyl) phosphite, 2,2-methylenebis(4,6-di-t-butylphenyl)octylphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide and 10-decyloxy-9,10-dihydro-9-oxa-10-phosphaphenanthrene; diphosphite-based compounds, such as 4,4'-butylidene-bis(3-methyl-6-t-butylphenyl-di-tridecylphosphite), 4,4'-isopropylidene-bis(phenyl-di-alkyl(C12-C15) phosphite), 4,4'-isopropylidene-bis(diphenylmonoalkyl(C12-C15)phosphite), 1,1,3-tris(2-methyl-4-di-tridecylphosphite-5-t-butylphenyl)butane and tetrakis(2,4-di-t-butylphenyl)-4,4'-biphenylene phosphite; and the like. Of those, monophosphite-based compounds are preferred.

Examples of the sulfur-based antioxidant include dilauryl 3,3'-thiodipropionate, distearyl 3,3-thiodipropionate, lauryl stearyl 3,3'-thiodipropionate, pentaerythritol-tetrakis-(3-lauryl-thiopropionate), 3,9-bis(2-dodecylthioethyl)-2,4,8,10-tetraoxaspiro[5.5]undecane, and the like.

These antioxidants can be used solely or in combination of two or more thereof. In the final resin composition, the antioxidant utilized is typically about 0.001 parts by weight or more, or about 0.01 parts by weight or more, based on 100 parts by weight of the ionomer resin. In addition, the amount of antioxidant utilized is typically about 5 parts by weight or less, or about 1 part by weight or less, based on 100 parts by weight of the ionomer resin.

Examples of the ultraviolet ray absorber include benzotriazole-based ultraviolet ray absorbers, such as 2-(5-methyl-2-hydroxyphenyl)benzotriazole, 2-[2-hydroxy-3,5-bis(1,1'-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-5-methyl-2-hydroxyphenyl)-5-chlorobenzotriazole and 2-(3,5-di-t-amyl-2-hydroxyphenyl)benzotriazole, 2-(2'-hydroxy-5'-t-octylphenyl)triazole; hindered amine-based ultraviolet ray absorbers, such as 2,2,6,6-tetramethyl-4-piperidyl benzoate, bis(2,2,6,6-tetramethyl-4-piperidyl)sebacate, bis(1,2,2,6,6-pentamethyl-4-piperidyl)-2-(3,5-di-t-butyl-4-hydroxybenzyl)-2-n-butylmalonate and 4-(3-(3,5-di-t-butyl-4-hydroxyphenyl)propionyloxy)-1-(2-(3-(3,5-di-t-butyl-4-hydroxyphenyl)propionyloxy)ethyl)-2,2,6,6-tetramethylpiperidine; benzoate-based ultraviolet ray absorbers, such as 2,4-di-t-butylphenyl-3,5-di-t-butyl-4-hydroxybenzoate and hexadecyl-3,5-di-t-butyl-4-hydroxybenzoate; and the like.

These ultraviolet ray absorbers can be used solely or in combination of two or more thereof. In the final resin composition, the amount of ultraviolet ray absorber utilized is typically about 10 ppm by weight or more, or about 100 ppm by weight or more, based on the weight of the ionomer resin. In addition, the amount of ultraviolet ray absorber utilized is typically about 50,000 ppm or less, or about 10,000 ppm or less, based on the weight of the ionomer resin.

In some embodiments, it is also possible to use two or more types of UV absorbers in combination.

In other embodiments, no UV absorber is added, or the laminate is substantially UV absorber additive free.

Examples of the photostabilizer include hindered amine-based materials, such as "ADEKA STAB LA-57" (a trade name) manufactured by Adeka Corporation, and "TINUVIN 622" (a trade name) manufactured by Ciba Specialty Chemicals Inc.

Solar Heat/Infrared Resistant Materials

When a laminated glass is prepared by incorporating a heat-shielding fine particle or a heat-shielding compound as the heat-shielding material into the interlayer of the present invention to give a heat-shielding function to the laminate, transmittance of the sun's infra-red radiation can be regulated.

Suitable heat-shielding fine particles are disclosed, for example, in US2017/0320297A1.

Specific examples of the heat-shielding fine particle include a metal-doped indium oxide, such as tin-doped indium oxide (ITO), a metal-doped tin oxide, such as antimony-doped tin oxide (ATO), a metal-doped zinc oxide, such as aluminum-doped zinc oxide (AZO), a metal element composite tungsten oxide represented by a general formula: $M_mWO_n$ (M represents a metal element; m is about 0.01 or more and about 1.0 or less; and n is about 2.2 or more and about 3.0 or less), zinc antimonate ($ZnSb_2O_5$), lanthanum hexaboride, and the like. Of those, ITO, ATO, and a metal element composite tungsten oxide are preferred, and a metal element composite tungsten oxide is more preferred. Examples of the metal element represented by M in the metal element composite tungsten oxide include Cs, Tl, Rb, Na, K, and the like, and in particular, Cs is preferred. From the viewpoint of heat shielding properties, m is preferably about 0.2 or more, or about 0.3 or more, and it is preferably about 0.5 or less, or about 0.4 or less.

From the viewpoint of transparency of the ultimate laminate, an average particle diameter of the heat shielding fine particle is preferably about 100 nm or less, or about 50 nm or less. It is to be noted that the average particle diameter of the heat shielding particle as referred to herein means one measured by a laser diffraction instrument.

In the final resin composition, a content of the heat shielding fine particle is preferably about 0.01% by weight or more, or about 0.05% by weight or more, or about 0.1% by weight or more, or about 0.2% by weight or more relative to the weight of the ionomer resin. In addition, the content of the heat shielding fine particle is preferably about 5% by weight or less, or about 3% by weight or less.

Examples of the heat shielding compound include phthalocyanine compounds, naphthalocyanine compounds, and the like. From the viewpoint of further improving the heat shielding properties, it is preferred that the heat shielding compound contains a metal. Examples of the metal include Na, K, Li, Cu, Zn, Fe, Co, Ni, Ru, Rh, Pd, Pt, Mn, Sn, V, Ca, Al, and the like, with Ni being especially preferred.

A content of the heat shielding compound is preferably about 0.001% by weight or more, or about 0.005% by weight or more, or about 0.01% by weight or more, based on the weight of the ionomer resin. In addition, the content of the heat shielding compound is preferably about 1% by weight or less, or about 0.5% by weight or less.

Colored Interlayers

Colored interlayers can be formed as generally known in the art.

For example, one or more pigments can be added to one or more of the ionomer resin compositions as generally disclosed in US2008/0302461A1.

Blends of one or more of the inorganic particles with one or more dyes can also be used.

In some cases, it may be desired to form a translucent interlayer to produce laminates, for example, having the aesthetic qualities of etched or sandblasted glass, such as disclosed in U.S. Pat. No. 7,261,943B2, or having a translucent white appearance, such as disclosed in US2013/0225746A1.

Decorative glass laminates bearing an image can also be prepared as described, for example, in U.S. Pat. No. 7,232,213B2.

Glass

When the constitution of the polymeric interlayer of the present invention is included in the inside of a glass, it is possible to obtain a laminated glass with excellent hurricane damage resistance, a laminated glass with excellent sound insulating properties, particularly sound insulating properties in a high-frequency region, a laminated glass with excellent sound insulating properties and stability of sound insulating performance, and a laminated glass with excellent sound insulating properties over a broad temperature range.

For that reason, the laminated glass of the present invention can be suitably used as part of a building member for a window, a wall, a roof, a sunroof, a sound insulating wall, a display window, a balcony, a handrail wall, or the like; a partition glass member of a conference room; and the like.

In general, two sheets of glass are used for the laminated glass of the present invention. Though a thickness of the glass constituting the laminated glass of the present invention is not particularly limited, it is preferably about 3 mm to about 12 mm, typically about 6 mm.

The glass used can be inorganic or organic in nature. Inorganic glass includes not only window glass, plate glass, silicate glass, sheet glass, low iron glass, tempered glass, tempered CeO-free glass, and float glass, but also to include colored glass, specialty glass (such as those include ingredients to control, e.g., solar heating), coated glass (such as those sputtered with metals (e.g., silver or indium tin oxide) for solar control purposes), E-glass, Toroglass, Solex® glass (PPG Industries, Pittsburgh, Pa.). Such specialty glasses are disclosed in, e.g., U.S. Pat. Nos. 4,615,989, 5,173,212, 5,264,286, 6,150,028, 6,340,646B1, 6,461,736B1 and 6,468,934B2. The type of glass to be selected for a particular laminate depends on the intended use.

Organic glass can include, but is not limited to, polycarbonates, acrylics, polyacrylates, cyclic polyolefins (e.g., ethylene norbornene polymers), polystyrenes (preferably metallocene-catalyzed polystyrenes), polyamides, polyesters, fluoropolymers and the like and combinations of two or more thereof.

In addition, it is preferred that a concave and convex structure, such as a melt fracture and/or an embossing, is formed on the surface of the interlayer of the present invention by a conventionally known method. A shape of the melt fracture or embossing is not particularly limited, and those which are conventionally known can be adopted.

Preferably, at least one surface (and more preferably both surfaces) of the interlayer for a laminated glass is shaped. By shaping at least one surface of the interlayer for a laminated glass, in the case where a laminated glass is produced, an air bubble present at an interface between the interlayer for a laminated glass and a glass easily escapes to the outside of the laminated glass, and thus, the appearance of the laminated glass can be made favorable. It is preferred to shape at least one surface of the interlayer for a laminated glass by an embossing roll method, melt fracture, or the like. By shaping the surface of the interlayer for a laminated glass, a concave portion and/or a convex portion are/is formed on the surface of the interlayer for a laminated glass.

Examples of a method for shaping the surface of the interlayer for a laminated glass include a conventionally known embossing roll method, a profile extrusion method, and an extrusion lip embossing method utilizing melt fracture. Among these, an embossing roll method is preferred for stably obtaining the interlayer for a laminated glass having uniform and fine concave and convex portions formed thereon.

An embossing roll to be used in the embossing roll method can be produced by, for example, using an engraving mill (mother mill) having a desired concave-convex pattern and transferring the concave-convex pattern to the surface of a metal roll. Further, an embossing roll can also be produced using laser etching. Further, after forming a fine concave-convex pattern on the surface of a metal roll as described above, the surface with the fine concave-convex pattern is subjected to a blast treatment using an abrasive material such as aluminum oxide, silicon oxide, or glass beads, whereby a finer concave-convex pattern can also be formed.

Further, the embossing roll to be used in the embossing roll method is preferably subjected to a release treatment. In the case where an embossing roll which is not subjected to a release treatment is used, it becomes difficult to release the interlayer for a laminated glass from the embossing roll. Examples of a method for the release treatment include known methods such as a silicone treatment, a Teflon (registered trademark) treatment, and a plasma treatment.

The depth of the concave portion and/or the height of the convex portion (hereinafter sometimes referred to as "the height of the embossed portion") of the surface of the interlayer for a laminated glass shaped by an embossing roll method or the like are/is preferably about 5 µm or more, or about 10 µm or more, or about 20 µm or more. When the height of the embossed portion is about 5 µm or more, in the case where a laminated glass is produced, an air bubble present at an interface between the interlayer for a laminated glass and a glass is less likely to remain, and thus, the appearance of the laminated glass tends to be improved.

The height of the embossed portion is preferably about 150 µm or less, or about 100 µm or less, or about 80 µm or less. When the height of the embossed portion is about 150 µm or less, in the case where a laminated glass is produced, the adhesiveness between the interlayer for a laminated glass and a glass becomes favorable, and thus, the appearance of the laminated glass tends to be improved.

In the invention, the height of the embossed portion refers to a maximum height roughness (Rz) defined in JIS B 0601 (2001). The height of the embossed portion can be measured by, for example, utilizing the confocal principle of a laser microscope or the like. Incidentally, the height of the embossed portion, that is, the depth of the concave portion or the height of the convex portion may vary within a range that does not depart from the gist of the invention.

Examples of the form of the shape imparted by an embossing roll method or the like include a lattice, an oblique lattice, an oblique ellipse, an ellipse, an oblique groove, and a groove. Among these, the form is preferably an oblique lattice, an oblique groove, or the like from the viewpoint that an air bubble more favorably escapes. The inclination angle is preferably from 10° to 80° with respect to the film flow direction (MD direction).

The shaping by an embossing roll method or the like may be performed on one surface of the interlayer for a laminated glass, or may be performed on both surfaces, but is more preferably performed on both surfaces. Further, the shaping pattern may be a regular pattern or an irregular pattern such as a random matte pattern, or a pattern such as disclosed in U.S. Pat. No. 7,351,468B2.

Sound Insulating/Acoustic Properties Generally

The sound insulating properties of laminated glass may be measured directly using a sound transmission loss (STL) method such as that specified in ASTM E90-2016. In this method, two adjacent reverberation rooms are arranged with an opening between them in which the test sample is installed. An approximately diffuse sound field is produced in one room, the source room. Sound incident on the test partition causes it to vibrate and create a sound field in the second room, the receiving room. The space- and time-averaged sound pressure levels in the two rooms are determined. In addition, with the test specimen in place, the sound absorption in the receiving room is determined. The sound pressure levels in the two rooms, the sound absorption in the receiving room and the area of the specimen are used to calculate sound transmission loss. This is a measure of the sound pressure change resulting from the sound barrier properties of the sample. Because transmission loss is a function of frequency, measurements are made in a series of frequency bands.

Sound transmission loss behavior over a range of test frequencies can be complex. In order to expedite comparisons between different laminated glass structures, the acoustic barrier performance may be simply represented by a single number classification rating called the sound transmission class (STC). The STC classification is determined by fitting a standard reference curve to the STL measurements by following the procedure specified in ASTM E413-10. Higher values of STC represent superior acoustic barrier performance.

Preferably the STC is at least 40, when measured as follows. STL was measured at ⅓ octave bands over a frequency range of 50 Hz to 10,000 Hz. A sample size of 34 inches×76 inches was employed and all measurements were performed at 20° C., in accordance with ASTM E90-09. The STC was determined from STL measurements by following the analysis procedure specified in ASTM E413-10.

Heat-Shielding/Solar Resistance Properties

In the case where the laminated glass of the present invention includes a heat-shielding material, a transmittance at a wavelength of 1,500 nm is preferably about 50% or less, or about 20% or less. When the transmittance at a wavelength of 1,500 nm is about 50% or less, there is a tendency that a shield factor of infrared rays is high, so that heat shielding performance of the laminated glass is improved.

Heat/Shielding and solar resistance can also be provide by the use of low-E glass and/or IR reflective technology such as generally known to those of ordinary skill in the relevant art, for example, as disclosed in U.S. Pat. No. 7,291,398B2.

Haze

Haze is the percentage of luminous flux that is scattered at a specified angle.

In one embodiment, in the laminated glass of the present invention, when the multilayer interlayer is laminated between two panes of glass of a thickness of 6 mm each to produce a laminate, a haze thereof as measured in accordance with ASTM D1003-61 (method A) at an angle of more than 2.5 degrees from the axis defined by the path of unscattered light traveling through the laminate (using a Hazegard-i hazemeter, available from BYK-Gardner USA of Columbia, MD, USA), is preferably about 0.6% or less, or about 0.55% or less, or about 0.5% or less.

Production Method of Laminating Glass

It is possible to produce the laminated glass of the present invention by a conventionally known method. Examples thereof include a method of using a vacuum laminator, a method of using a vacuum bag, a method of using a vacuum ring, a method of using a nip roll, and the like. In addition, a method can be used in which, after temporary contact bonding, the resultant laminate is put into an autoclave for final bonding.

In the case of using a vacuum laminator, for example, a known instrument which is used for production of a solar cell is used, and the assembly is laminated under a reduced pressure of about $1\times10^{-6}$ MPa or more and about $3\times10^{-2}$ MPa or less at a temperature of about 100° C. or higher, or about 130° C. or higher, and about 200° C. or lower, or about 170° C. or lower. The method of using a vacuum bag or a vacuum ring is, for example, described in the specification of EP1235683A1 (CA2388107A1), and for example, the assembly is laminated under a pressure of about $2\times10^{-2}$ MPa at about 130° C. or higher and about 145° C. or lower.

With respect to the preparation method of a laminated glass, in the case of using a nip roll, for example, there is exemplified a method in which after conducting first temporary contact bonding at a temperature of a flow starting temperature of the skin resin or lower, temporary contact bonding is further conducted under a condition close to the flow starting temperature. Specifically, for example, there is exemplified a method in which the assembly is heated at about 30° C. or higher and about 100° C. or lower by an infrared heater or the like, then deaerated by a roll, and further heated at about 50° C. or higher and about 150° C. or lower, followed by conducting contact bonding by a roll to achieve bonding or temporary bonding.

In addition, a laminated glass may also be prepared by gathering and laminating glasses in which the layer B is coated on the both surfaces of the layer A such that the constitution of the laminate of the present invention is included in the inside of the laminated glass.

Though the autoclave process which is supplementarily conducted after the temporary contact bonding is variable depending upon the thickness or constitution of a laminate, it is, for example, carried out under a pressure of about 1 MPa or more and about 15 MPa or less at a temperature of about 120° C. or higher and about 160° C. or lower for about 0.5 hours or more and about 2 hours or less.

Hurricane Impact and Pressure Cycling Tests

For architectural uses in coastal areas, a glass/interlayer/glass laminate must pass a simulated hurricane impact and pressure cycling test which measures resistance of the laminate to debris impact and wind pressure cycling. A currently acceptable test is performed in accordance to ASTM 1996-2017. This test simulates the forces of the wind plus airborne debris impacts during severe weather, e.g., a hurricane.

The test consists of two impacts on the laminate (one in the center of the laminate sample followed by a second impact in a corner of the laminate). The impacts are done by launching a 9-pound (4.1 kilograms) board nominally 2 inches (5 cm) by 4 inches (10 cm) and 8 feet (2.43 meters) long at 50 feet/second (15.2 meters/second) from an air pressure cannon. If the laminate survives the above impact sequence, it is subjected to an air pressure cycling test. In this test, the laminate is securely fastened to a chamber. In the positive pressure test, the laminate with the impact side outward is fastened to the chamber and a vacuum is applied to the chamber and then varied to correspond with the cycling sequences set forth in the following Table 1. The pressure cycling schedule, as shown in Table 1 below, is specified as fraction of a maximum pressure P. Each cycle of the first 3500 cycles and subsequent cycles is completed in about 1-3 seconds. On completion of the positive (+) pressure test sequence, at a pressure of 6.22 kPa, for example, the laminate may be reversed with the impact side facing inward to the chamber for the negative pressure portion of the test and a vacuum is applied corresponding to the following cycling sequence. These values are then expressed as negative values (−).

A laminate passes the impact and cycling test when there are no tears or openings over 5 inches (12.7 cm) in length and not greater than 1/16 inch (0.16 cm) in width.

All glass laminates are prepared by placing the interlayer between the glass panels. Each of the glass panels is washed with deionized water. Each of the glass panels is washed with deionized water. The laminates are placed in an air autoclave at 160 PSIG (1.1 MPa) pressure at 135° C. for 90 minutes. The laminates for the impact testing are 31.5 inches (80 cm) wide by 72 inches (183 cm) high. Laminates were then clamped into an aluminum frame using a Neoprene® pressure gasket. This frame was then mounted into a steel supporting frame to conduct the impact test in such a way to minimize movement of the overall glazing. The laminates tested and displayed in Table 2 were impact tested to measure the impact "toughness" against the timber missile. The laminates of Table 2 were tested according to the Florida impact and then subjected to the positive portion of air pressure cycling test sequence only. In the impact test a missile of a 9-pound (4.1 kilograms) pine board nominally 2 inches (5 cm) by 4 inches (10 cm) and 8 feet (2.43 meters) long is propelled against the laminate at 50 feet/second (15.2 meters/second) from an air pressure cannon striking the laminate "normal" to its surface. Each of the laminates is subjected to two impacts in two different locations of the laminate, which fractures the glass. The results of the impact and positive portion of the pressure cycling tests are shown below in Table 2 below.

Specific Embodiments

A specific embodiment of the present invention is a multilayer interlayer which when laminated between two panes of glass of a thickness of 6 mm each to produce a laminate, the resulting laminate possesses a combination of: a) a sound transmission class (STC) of 40 or greater (as in accordance with ASTM E90-2016 and ASTM E413-2010 as described above), b) and a laminate haze of less than about 0.6 (as determined in accordance with ASTM D1003-61 (method A) as described above), c) hurricane large-missile (Level D) impact and positive pressure cycling resistance to 6.22 kPa in accordance with ASTME1996-2017 as described above, and d) solar barrier protection by regulating transmission of the sun's infra-red radiation.

EXAMPLES

The invention will be further understood from the following specific examples of the properties of the laminated glass. However, it will be understood that these examples are not to be construed as limiting the scope of the present invention in any manner.

Samples were prepared as follows. Multilayer interlayers were prepared according to the disclosure below, and are described in Table 2 below. Monolayer interlayers are also described in Table 2.

The laminates were constructed using two plies of 6 mm heat strengthened glass between which the identified interlayer is sandwiched. The laminates were prepared using vacuum bag lamination process described above. For hurricane testing according to ASTM E1996-2017, the laminate size was 800 mm by 1829 mm, and were dry-glazed in an aluminum window frame. The peak pressure was 6.22 kPa. For acoustic testing according to ASTM E90-2016, the laminate size was 864 mm by 1930 mm.

The following physical properties evaluations were conducted with respect to the laminated glasses obtained in the following Examples E1-E2, Comparative Examples CE1-CE2, and Control Examples C1-C4.

Materials

The materials used in the following examples are as follows.

Melt indices (MI) were measured according to ASTM D1238 at a polymer melt temperature of 190° C. and under a weight of 2.16 kg.

The soda-lime-silica float glass, with a thickness of 6 mm or greater, used in the Examples was obtained from Dolphin Glass, Inc. (FL, USA).

CI1—an at least partially neutralized ethylene acid dipolymer ionomer obtained from E.I. du Pont de Nemours & Co. (Wilmington, DE, USA) (21.7% methacrylic acid, Na 26% neutralized, MI=1.8).

CI2—an at least partially neutralized ethylene acid terpolymer ionomer obtained from E.I. du Pont de Nemours & Co. (Wilmington, DE, USA) (217% methacrylic acid, 6.5% i-butyl acrylate, Na 25% neutralized, MI=3.8).

I1—a monolayer ionomer interlayer sold by Kuraray America, Inc. (Wilmington, DE, USA) under the trademark "SENTRYGLAS®", made from CI1.

I2—a monolayer terionomer interlayer sold by Kuraray America, Inc. (Wilmington, DE, USA) under the trademark "SENTRYGLAS® XTRA™", made from CI2, as described in US20190030863A1.

TPE1—a hydrogenated polystyrene-polyisoprene-polystyrene tri-block copolymer thermoplastic elastomer having a content of 1,2-bond and 3,4-bond of 75%. Hard block/soft block ratio [Mw(A1)/Mw(A2)] of 1.00, a glass transition temperature of −15° C., a styrene content of 21% by mass, a hydrogenation rate of 84% and a weight-average molecular weight of 120,000. Commercially available as "HYBRAR™ H7125" from Kuraray Co., Ltd. (Tokyo, Japan).

TPE2—a hydrogenated polystyrene-polyisoprene/polybutadiene-polystyrene tri-block copolymer thermoplastic elastomer. Hard block/soft block ratio [Mw(A1)/Mw(A2)] of 0.30, a glass transition temperature of −30° C., a styrene content of 13% by mass, a hydrogenation rate of 85% and a weight-average molecular weight of 130,000. Commercially available as "HYBRAR™ H7311" from Kuraray Co., Ltd. (Tokyo, Japan).

TPE—a monolayer made by blending TPE1 and TPE2 in a 1:1 ratio and extruding into a homogenous single layer (see below in multilayer film preparation).

PVB1—TROSIFOL™ Clear standard PVB monolayer sheet, commercially available from Kuraray America, Inc., Houston, TX, USA.

PVB2—TROSIFOL™ SC+ interlayer (trilayer PVB sheet)—a polyvinyl butyral trilayer as described in U.S. Pat.

No. 8,314,848, commercially available from Kuraray Europe GmbH, Frankfurt, DE

PVB3—TROSIFOL™ ES sheet—a "stiff" PVB monolayer, commercially available from Kuraray Europe GmbH, Frankfurt, DE Multilayer Film Preparation A trilayer film comprising of a CI2|TPE|CI2 structure (0.265 mm|0.196 mm|0.235 mm) was manufactured as follows. Ionomer (CI2) resin pellets and additives (in master-batch) were fed to a skin layer extruder. The polymer was melted and heated through the zones of the extruder and discharged at a melt temperature of approximately 196° C. The ionomer melt was transferred by a heated melt line to a feed-block where the ionomer flow was split to form the two outer layers (A and C) of the interlayer structure.

The thermoplastic elastomer resin (TPE1 and TPE2) pellets and additives (in master-batch) were fed to the core layer extruder. The elastomer polymer was melted and heated through the extruder and discharged at a melt temperature of approximately 213° C. The elastomer melt was transported by a heated melt line to the feed-block maintained at approximately 204° C. The elastomer melt flowed through the feed-block with the split ionomer layers contacting the elastomer on the top and bottom to form a trilayer sheet structure.

The melt phases were passed to the extrusion die maintained at approximately 204° C. and extruded through the die lips. The flow rates from the skin (ionomer) extruder and the core (elastomer) extruder were adjusted to give the desired ratio of skin-to-core layer thickness in the final sheet. The melt temperatures of each extruder were adjusted to give a good match of the melt viscosities of each polymer phase to prevent flow instabilities and optical distortion of the sheeting. The adjusters on the die lips were opened or closed to allow adjustment and improvement of the thickness (caliper) uniformity across the width of the sheet. The line speed was adjusted to give the desired total sheet caliper (sheet thickness).

The melt exiting the extrusion die was passed over a series of chilled rolls to cool the melt, forming the sheet product. The sheet was transported across a set of unheated transport rollers to further cool the sheeting. The solid sheet passed through a nip roll set to control and maintain constant line speed. The sheet was then wound on to a core at the windup (set to maintain constant tension in the sheeting) between the nip roll and the windup.

Glass Laminate Preparation

A pre-press assembly, in which the polymer interlayer laminate films and glass were stacked in the desired order at room temperature, was placed into a disposable vacuum bag and held for 60 minutes under a vacuum of 25-30 inches of water to remove any air contained between the layers of the pre-press assembly. The pre-press assembly was loaded while still applying a vacuum to the bag into an air autoclave. The samples and bags were heated to 135° C. under an applied hydrostatic air pressure of 0.7 MPa. The vacuum to the bag was removed after reaching 135° C. and the laminates were held for 90 minutes in an air autoclave at an applied hydrostatic pressure of 0.7 MPa. The samples were then cooled at an approximate rate of 4° C./minute under constant pressure. After approximately 25 minutes of cooling, when the air temperature was less than about 50° C., the excess pressure was vented and the laminate was cooled to room temperature and removed from the autoclave.

The process used in the examples is similar to many standard industrial processes for the fabrication of laminated glass and resulted in materials with high clarity and minimal imperfections (bubbles etc.).

Laminate Structures

All laminates were made with 6 mm heat strengthened (HS) glass.

C1—Control 6 mm HS glass|2.3 mm I1|6 mm HS glass. Commonly used commercial hurricane-resistant laminate using Kuraray SentryGlas® ionoplast interlayer. Note that this a single layer of ionomer interlayer.

C2—Control 6 mm HS glass|2.3 mm I2|6 mm HS glass. Commercial hurricane-resistant laminate using Kuraray SentryGlas® XTRA™ ionoplast interlayer. Note that this a single layer of a terionomer interlayer with enhanced adhesion performance.

C3—Control 6 mm HS glass|2.3 mm PVB1|6 mm HS glass. Commercial hurricane-resistant laminate using standard PVB. The overall interlayer caliper (2.3 mm) was achieved by stacking 3×0.76 mm PVB1 films together during laminate fabrication. All films fuse together to form one homogeneous interlayer during the autoclave portion of the laminating cycle.

C4—Control 6 mm HS glass|2.3 mm PVB3|6 mm HS glass. Commercial hurricane-resistant laminate using enhanced stiffness PVB. The overall interlayer caliper (2.3 mm) was achieved by stacking 3×0.76 mm PVB3 films together during laminate fabrication. All films fuse together to form one homogeneous interlayer during the autoclave portion of the laminating cycle.

CE1—Comparative Example 6 mm HS glass|2.3 mm (PVB1/PVB2/PVB1)|6 mm HS glass. The overall interlayer caliper (2.3 mm) was achieved by stacking 3×0.76 mm films together during laminate fabrication. Note that PVB2 comprises a trilayer film with an enhanced acoustic core layer. All films fuse together during the autoclave portion of the laminating cycle. However, a distinct acoustic center layer remains.

CE2—Comparative Example 6 mm HS glass|2.3 mm (PVB3/PVB2/PVB3)|6 mm HS glass. The overall interlayer caliper (2.3 mm) was achieved by stacking 3×0.76 mm films together during laminate fabrication. All films fuse together during the autoclave portion of the laminating cycle. However, a distinct acoustic center layer remains from the PVB2 film.

E1—Example 6 mm HS glass|2.3 mm (I1|CI2/TPE/CI2|I1)|6 mm HS glass. The overall interlayer caliper (2.3 mm) was achieved by stacking 3×0.76 mm films together during laminate fabrication. All films fuse together during the autoclave portion of the laminating cycle. However, a distinct acoustic center layer (TPE) remains.

E2—Example 6 mm HS glass|2.3 mm (I2|CI2/TPE/CI2|I2)|6 mm HS glass. The overall interlayer caliper (2.3 mm) was achieved by stacking 3×0.76 mm films together during laminate fabrication. All films fuse together during the autoclave portion of the laminating cycle. However, a distinct acoustic center layer (TPE) remains. Ionomer I2 provides enhanced adhesion versus ionomer I1.

Physical Properties Evaluation

The following properties were measured for each of the laminated glass examples, controls and comparative examples:

Hurricane Performance (ASTM E1996-2017)—Large missile impact (Level D) followed by pressure cycling (4,500 positive cycles only) to peak pressure of 6.22 kPa.

Acoustic Barrier Properties (ASTM E90-2016) to generate sound transmission loss (STL) characteristics and then extract the sound transmission class (STC) using ASTM E413-2010).

Laminate Haze—determined in accordance with ASTM D1003-61 (method A) as described above.

The laminate structures and measurement results are summarized in Table 2. As can be seen from the results, only the use of interlayers in accordance with the present invention provided laminates with an overall desirable combination of acoustic barrier performance, hurricane resistance and solar barrier performance and haze characteristics.

TABLE 1

Hurricane pressure cycling sequence after impact (Level D) - positive pressure cycles only following ASTME1997-2017

| Number of Air Pressure Cycles | Pressure Range (kPa) |
|---|---|
| 3500 | 1.25-3.11 |
| 300 | 0-3.73 |
| 600 | 3.11-4.98 |
| 100 | 1.87-6.22 |

TABLE 2

Laminate construction tested: 6 mm HS Glass | 2.3 mm Interlayer | 6 mm HS Glass

| Example | Interlayer (2.3 mm) | Haze | Hurricane Test Result | Acoustics Test STC |
|---|---|---|---|---|
| C1 | I1 | 0.48 | Pass | 36 |
| C2 | I2 | 0.33 | Pass | 36 |
| E1 | I1 | CI2/TPE/CI2 | I1 | 0.46 | Pass | 40 |
| E2 | I2 | CI2/TPE/CI2 | I2 | 0.43 | Pass | 40 |
| CE2 | PVB1 | PVB2 | PVB1 | 0.51 | Fail | 39 |
| C3 | PVB1 | 0.42 | Fail | 38 |
| CE2 | PVB3 | PVB2 | PVB3 | 0.55 | Fail | 38 |
| C4 | PVB3 | 0.50 | Pass | 36 |

We claim:

1. A multilayer polymeric interlayer comprising: a structure of Layer A/Layer B/Layer C; wherein:
   (1) Layer A is a layer of a first ionomer resin composition,
   (2) Layer C is a layer of a second ionomer resin composition, and
   (3) Layer B is an acoustic damping layer between Layer A and Layer C, comprising:
   a trilayer structure of Layer B1/Layer B2/Layer B3, wherein Layers B1 and B3 comprise, respectively, a third and a fourth ionomer resin composition, and Layer B2 comprises the acoustic damping resin composition;

wherein:
   the Layers A, B1, B2, B3 and C are directly stacked one to another in the order listed,
   the first and second ionomer resin compositions comprise a dipolymer consisting essentially of copolymerized units of: (i) ethylene, and (ii) from about 10 wt % to about 30 wt % of at least one α,β-unsaturated carboxylic acid having 3 to 10 carbon atoms, wherein the weight percentages of the copolymerized units are based on the total weight of the ethylene acid copolymer and the sum of the weight percentages of the copolymerized units is 100 wt %, and wherein at least a portion of carboxylic acid groups of the α,β-unsaturated carboxylic acid are neutralized to form an ionomer comprising carboxylate groups having sodium counterions,
   the third and fourth ionomer resin compositions comprise a terpolymer of copolymerized units of: (i) ethylene, (ii) from about 10 wt % to about 30 wt % of at least one α,β-unsaturated carboxylic acid having 3 to 10 carbon atoms, (iii) from about 2 wt % to about 15 wt % of at least one α,β-unsaturated carboxylic acid ester having 3 to 10 carbon atoms, and (iv) optionally a derivative of an α,β-unsaturated carboxylic acid other than (iii) in an amount such that (iii)+(iv) is 15 wt % or less, wherein the weight percentages of the copolymerized units are based on the total weight of the ethylene acid copolymer and the sum of the weight percentages of the copolymerized units is 100 wt %,
   each of Layers A and C is individually from about 0.5 mm to about 2.5 mm thick; and
   the multilayer polymeric interlayer is from about 2 mm to about 5 mm thick.

2. The multilayer polymeric interlayer of claim 1, wherein Layer B2 has a thickness of about 0.01 mm or more, and about 0.5 mm or less; Layers B1 and B3 are each individually from about 0.25 mm to about 1.0 mm thick; and the combined thickness of Layer B1+Layer B2+Layer B3 is about 0.5 mm or more, and about 2 mm or less.

3. The multilayer polymeric interlayer of claim 1, wherein the first and second ionomer resin compositions are the same.

4. The multilayer polymeric interlayer of claim 1, wherein the third and fourth ionomer resin compositions are the same.

5. The multilayer polymeric interlayer of claim 1, wherein the layer B2 of the acoustic damping resin composition has a modulus of from about 10 MPa to about 100 MPa and Tan Delta (tan δ) (damping) of from about 1.0 to about 2.0 as measured by ASTM D4065-12—Shear Geometry at 1,000 Hz and 20.degree.C.

6. The multilayer polymeric interlayer of claim 1, wherein the acoustic damping resin is a thermoplastic elastomer.

7. The multilayer polymeric interlayer of claim 6, wherein the thermoplastic elastomer is a hydrogenated product of a block copolymer having: (i) an aromatic vinyl polymer block (a) containing about 60 mol % or more of an aromatic vinyl monomer unit, based on the aromatic vinyl polymer block, and (ii) an aliphatic unsaturated polymer block (b) containing about 60 mol % or more of a conjugated diene monomer unit, based on the aliphatic unsaturated polymer block, wherein the aliphatic unsaturated polymer block (b) contains about 50 mol % or more in total of an isoprene unit and a butadiene unit as the conjugated diene monomer unit, and wherein the amount of residual carbon-carbon double bonds the aliphatic unsaturated polymer block derived from conjugated diene monomer units is from about 2 to about 40 mol %.

8. The multilayer interlayer of claim 6, wherein the acoustic damping resin composition comprises two or more thermoplastic elastomer resins each having a different peak temperature of tan δ.

9. The multilayer polymeric interlayer of claim 1, wherein the acoustic damping resin composition is substantially plasticizer free.

10. The multilayer polymeric interlayer of claim 1, which is substantially plasticizer free.

11. The multilayer polymeric interlayer of claim 1, further comprising one or more infrared and/or UV absorbing materials.

12. The multilayer polymeric interlayer of claim 1, wherein the multilayer polymeric interlayer is from about 2 mm to about 4 mm thick.

13. A glass laminate, comprising the multilayer polymeric interlayer of claim 1, wherein a sound barrier performance of the glass laminate is at least a sound transmission classification (STC) of at least 40 as measured according to ASTM E90-2016, and passes a large-missile impact and pressure cycling hurricane resistance test measured according to ASTM E1996-2017.

14. The glass laminate of claim 13, that exhibits a sound transmission classification (STC) of at least 40 as measured according to ASTM E90-2016 and analyzed following ASTM E413-10, and passes the positive pressure section of hurricane resistance test to a peak pressure of 6.22 kPa as measured according to ASTM E1996-2017.

15. The glass laminate of claim 13, having a total thickness of from about 8 mm to about 25 mm.

16. The glass laminate of claim 13, wherein the multilayer polymeric interlayer is substantially plasticizer free.

17. The glass laminate of claim 13, having a total thickness of from about 8 mm to about 25 mm.

* * * * *